United States Patent
Hsu et al.

(10) Patent No.: US 8,471,985 B2
(45) Date of Patent: Jun. 25, 2013

(54) LIQUID CRYSTAL DISPLAY PANEL

(75) Inventors: Jia-Lang Hsu, New Taipei (TW); Ting-Cheng Lin, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 198 days.

(21) Appl. No.: 13/085,484

(22) Filed: Apr. 13, 2011

(65) Prior Publication Data

US 2012/0169957 A1    Jul. 5, 2012

(30) Foreign Application Priority Data

Dec. 30, 2010 (TW) .............................. 99146939 A

(51) Int. Cl.
    *G02F 1/1335* (2006.01)
(52) U.S. Cl.
    USPC ............................................. 349/96; 349/58
(58) Field of Classification Search
    USPC ...................................................... 349/58, 96
    See application file for complete search history.

(56) References Cited

U.S. PATENT DOCUMENTS

2006/0076881 A1*  4/2006  Kim et al. .................... 313/496

FOREIGN PATENT DOCUMENTS

| CN | 101539683 | 9/2009 |
|----|-----------|--------|
| JP | 09-251159 | 9/1997 |
| JP | 2003-022027 | 1/2003 |
| JP | 2005-238727 | 9/2005 |
| JP | 2006-166029 | 6/2006 |

OTHER PUBLICATIONS

"First Office Action of China Counterpart Application", issued on Dec. 1, 2011, p. 1-p. 7.

* cited by examiner

*Primary Examiner* — Phu Vu
(74) *Attorney, Agent, or Firm* — Jianq Chyun IP Office

(57) ABSTRACT

A liquid crystal display (LCD) panel includes an active device array substrate, an opposite substrate, a liquid crystal layer, a polarizer, an analyzer, and a cover. The liquid crystal layer is configured between the active device array substrate and the opposite substrate. The polarizer is configured on the opposite substrate, and the polarizer and the liquid crystal layer are respectively located at two opposite sides of the opposite substrate. The analyzer is configured on the active device array substrate, and the analyzer and the liquid crystal layer are respectively located at two opposite sides of the active device array substrate. In addition, the cover is joined to the analyzer.

17 Claims, 5 Drawing Sheets

LIQUID CRYSTAL DISPLAY PANEL

CROSS-REFERENCE TO RELATED APPLICATION

This application claims the priority benefit of Taiwan application serial no. 99146939, filed Dec. 30, 2010. The entirety of the above-mentioned patent application is hereby incorporated by reference herein and made a part of this specification.

BACKGROUND OF THE INVENTION

1. Field of the Invention

The invention generally relates to a liquid crystal display (LCD) panel and particularly relates to an LCD panel with strong structural strength.

2. Description of Related Art

Nowadays, the performance requirements for thin film transistor liquid crystal displays (TFT-LCDs) are high contrast ratio, no gray scale inversion, little color shift, high luminance, high color vividness, high color saturation, short response time, wide-viewing angle, and so forth.

FIG. 1 is a schematic cross-sectional view illustrating a conventional LCD panel. With reference to FIG. 1, the conventional LCD panel 100 includes an active device array substrate 110, an opposite substrate 120, a liquid crystal layer 130, a polarizer 140, an analyzer 150, a cover 160, an optical adhesive layer 170, and a driver IC 180. The liquid crystal layer 130 is configured between the active device array substrate 110 and the opposite substrate 120. The polarizer 140 is configured on an outer surface of the active device array substrate 110. The polarizer 140 and the liquid crystal layer 130 are respectively located at two opposite sides of the active device array substrate 110. The analyzer 150 is configured on an outer surface of the opposite substrate 120, and the analyzer 150 and the liquid crystal layer 130 are respectively located at two opposite sides of the opposite substrate 120. In addition, the cover 160 is joined to the analyzer 150 through the optical adhesive layer 170. The driver IC 180 is electrically connected to the active device array substrate 110, and the driver IC 180 is located between the cover 160 and the active device array substrate 110.

It can be learned from FIG. 1 that the opposite substrate 120, the liquid crystal layer 130, the analyzer 150, and the optical adhesive layer 170 are sandwiched between the cover 160 and the active device array substrate 110. Therefore, a gap G1 exists between the cover 160 and the active device array substrate 110, and the gap G1 is substantially equal to the total thickness of the opposite substrate 120, the liquid crystal layer 130, the analyzer 150, and the optical adhesive layer 170. Note that a location X in the conventional LCD panel 100 cracks after an abnormal external force is exerted on the location X, and the reliability of the LCD panel 100 is thus deteriorated. Therefore, how to improve the reliability of the LCD panel 100 is one of the research topics in this industry.

SUMMARY OF THE INVENTION

The invention is directed to an LCD panel having strong structural strength.

In an embodiment of the invention, an LCD panel includes an active device array substrate, an opposite substrate, a liquid crystal layer, a polarizer, an analyzer, and a cover. The liquid crystal layer is configured between the active device array substrate and the opposite substrate. The polarizer is configured on the opposite substrate, and the polarizer and the liquid crystal layer are located at two opposite sides of the opposite substrate. The analyzer is configured on the active device array substrate, and the analyzer and the liquid crystal layer are respectively located at two opposite sides of the active device array substrate. The cover is joined to the analyzer.

According to an embodiment of the invention, the LCD panel further includes an optical adhesive layer. The optical adhesive layer and the analyzer are located at the same side of the active device array substrate, and the cover is joined to the analyzer through the optical adhesive layer.

According to an embodiment of the invention, the LCD panel further includes an adhesive material configured on the active device array substrate. The analyzer and the adhesive material are located at the same side of the active device array substrate, and the optical adhesive layer and the adhesive material are located at the same side of the active device array substrate.

According to an embodiment of the invention, the optical adhesive layer and the adhesive material are joined to the analyzer and the active device array substrate.

According to an embodiment of the invention, the active device array substrate has an active region corresponding to the analyzer. The adhesive material is located outside the active region. The optical adhesive layer covers the analyzer and the adhesive material. The cover is joined to the analyzer and the adhesive material through the optical adhesive layer. For instance, a thickness of the adhesive material is substantially equal to a thickness of the analyzer.

According to an embodiment of the invention, the adhesive material includes a tape or a glue.

According to an embodiment of the invention, the active device array substrate has an active region corresponding to the analyzer. The adhesive material is located outside the active region. The optical adhesive layer covers the analyzer. The cover is joined to the analyzer through the optical adhesive layer, and the cover is directly joined to the adhesive material. For instance, a thickness of the adhesive material is substantially equal to a total thickness of the analyzer and the optical adhesive layer.

According to an embodiment of the invention, the adhesive material includes a double-sided tape or a glue.

According to an embodiment of the invention, the active device array substrate has an active region, and the analyzer and the optical adhesive layer correspond to the active region and a region of the active device array substrate other than the active region.

According to an embodiment of the invention, the LCD panel further includes a driving chip electrically connected to the active device array substrate. The driving chip and the cover are respectively located at the two opposite sides of the active device array substrate.

According to an embodiment of the invention, the cover is adhered to the active device array substrate through the analyzer.

According to an embodiment of the invention, an area of the active device array substrate is greater than an area of the opposite substrate.

The cover and the active device array substrate are joined in this invention. Specifically, the cover and the active device array substrate can be joined together through the adhesive material with the relatively small thickness, or the cover and the active device array substrate can be joined directly by the analyzer.

To make the above and other features and advantages of the invention more comprehensible, several embodiments accompanied with figures are detailed as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

First Embodiment

Figure 1:
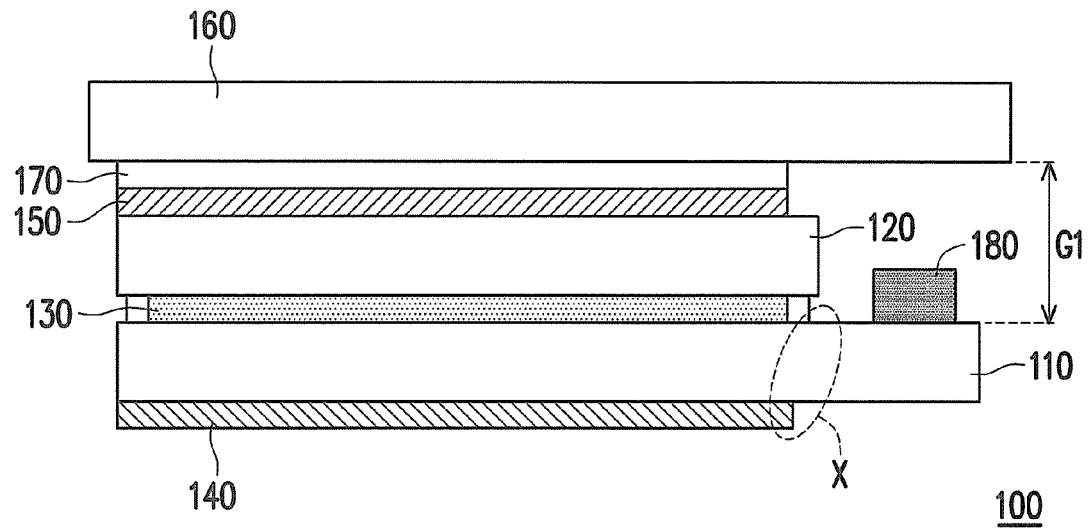
FIG. 1 is a schematic cross-sectional view illustrating a conventional LCD panel.
Figure 2:
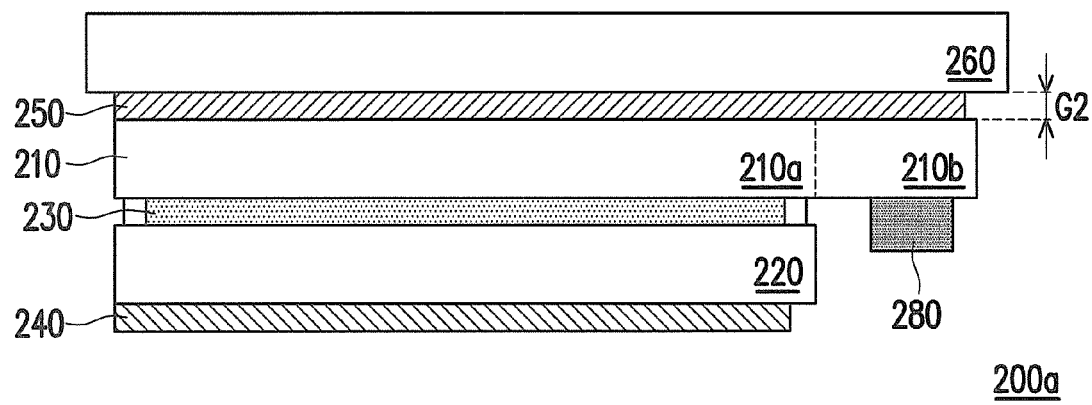
FIG. 2 is a schematic cross-sectional view illustrating an LCD panel according to a first embodiment of the invention.

FIG. 2 is a schematic cross-sectional view illustrating an LCD panel according to a first embodiment of the invention. With reference to FIG. 2, the LCD panel 200a of this embodiment includes an active device array substrate 210, an opposite substrate 220, a liquid crystal layer 230, a polarizer 240, an analyzer 250, and a cover 260. The liquid crystal layer 230 is configured between the active device array substrate 210 and the opposite substrate 220. The polarizer 240 is configured on the opposite substrate 220, and the polarizer 240 and the liquid crystal layer 230 are located at two opposite sides of the opposite substrate 220, respectively. The analyzer 250 is configured on the active device array substrate 210, and the analyzer 250 and the liquid crystal layer 230 are located at two opposite sides of the active device array substrate 210, respectively. In addition, the cover 260 is joined to the analyzer 250.

In this embodiment, the cover 260 is adhered to the active device array substrate 210 through the analyzer 250. Specifically, both sides of the analyzer 250 of this embodiment have stickiness, and thus the analyzer 250 can analyze polarization and have the adhesion function. As indicated in FIG. 2, the active device array substrate 210 of this embodiment has an active region 210a corresponding to the opposite substrate 220, for instance. The analyzer 250 corresponds to the active region 210a and a region 210b of the active device array substrate 210 other than the active region 210a. The analyzer 250 extends from the active region 210a to the region 210b, such that the active device array substrate 210 can be well joined to the cover 260. Hence, when an abnormal external force is exerted on the LCD panel 200a, the LCD panel 200a is not apt to break, and the reliability of the LCD panel 200a can be improved.

Note that the distance G2 between the cover 260 and the active device array substrate 210 is substantially equal to the thickness of the analyzer 250. Apparently, the distance G2 is less than the gap G1 described in the related art. Besides, the outer surface of the active device array substrate 210 is a flat surface, and therefore the active device array substrate 210 can be well joined to the cover 260 through the analyzer 250.

As shown in FIG. 2, the LCD panel 200a of this embodiment can further include a driving chip 280 electrically connected to the active device array substrate 210. The driving chip 280 and the cover 260 are located at the two opposite sides of the active device array substrate 210, respectively. In particular, the area of the active device array substrate 210 is greater than the area of the opposite substrate 220, and a portion of the peripheral region on the active device array substrate 210 is not covered by the opposite substrate 220. The driving chip 280 is electrically connected to the peripheral circuit on the active device array substrate 210. For instance, the driving chip 280 is joined to the active device array substrate 210 in a chip-on-glass (COG) manner. Certainly, the driving chip 280 can be joined to the active device array substrate 210 in a chip-on-board (COB) manner, a chip-on-film (COF) manner, and so on.

Second Embodiment

Figure 3A:
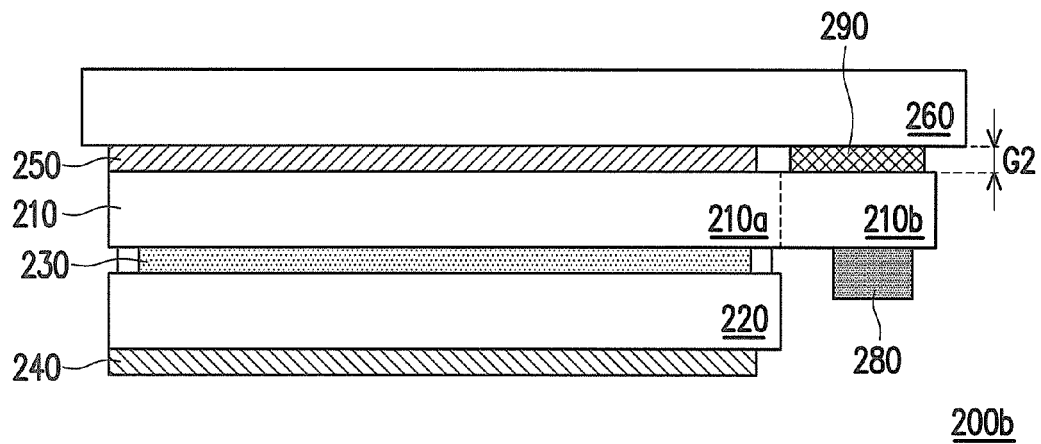
FIG. 3A and FIG. 3B are schematic cross-sectional views illustrating an LCD panel according to a second embodiment of the invention.
Figure 3B:
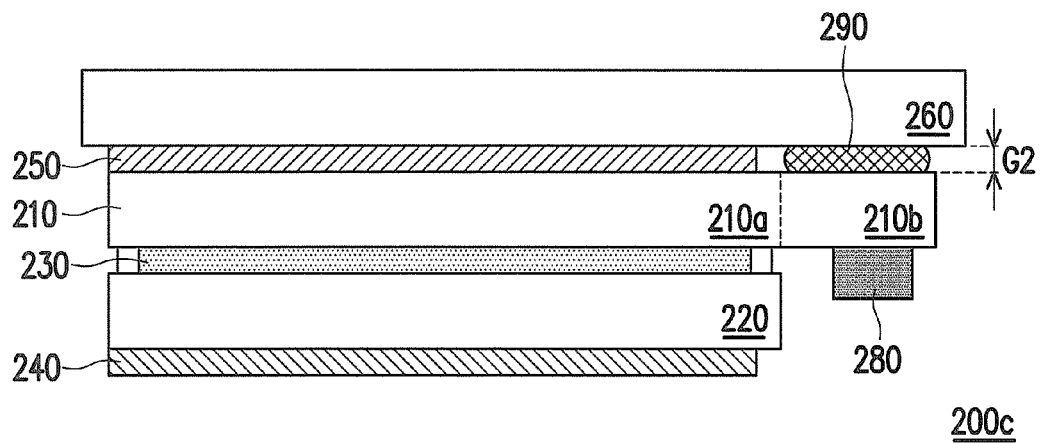

FIG. 3A and FIG. 3B are schematic cross-sectional views illustrating an LCD panel according to a second embodiment of the invention. With reference to FIG. 2, FIG. 3A, and FIG. 3B, the LCD panels 200b and 200c of this embodiment are similar to the LCD panel 200a of the first embodiment, while each of the LCD panels 200b and 200c of this embodiment further includes an adhesive material 290. The adhesive material 290 and the analyzer 250 are located at the same side of the active device array substrate 210, and the cover 260 is joined to the active device array substrate 210 through the adhesive material 290 or the analyzer 250. Specifically, the analyzer 250 corresponds to the active region 210a, and the adhesive material 290 corresponds to the region 210b. When both sides of the analyzer 250 have stickiness, the adhesive material 290 can be adhesive on one side. By contrast, when both sides of the analyzer 250 and both sides of the adhesive material 290 have stickiness, the cover 260 is joined to the active device array substrate 210 through the adhesive material 290 and the analyzer 250.

As shown in FIG. 3A and FIG. 3B, the adhesive material 290 can be directly in contact with or not in contact with the analyzer 250, and the thickness of the adhesive material 290 can be substantially the same as the thickness of the analyzer 250. Besides, in this embodiment, the adhesive material 290 is a double-sided tape, a single-sided tape (as shown in FIG. 3A), or a glue (as shown in FIG. 3B), for instance.

Based on the above, the adhesive material 290 of this embodiment can be easily chosen, i.e., the material that has the similar physical property (e.g. similar hardness, elasticity, and so on) to that of the analyzer 250 is applicable. When the physical property of the adhesive material 290 is similar to that of the analyzer 250, the adhesion between the cover 260 and the active device array substrate 210 is rather strong.

Third Embodiment

Figure 4:
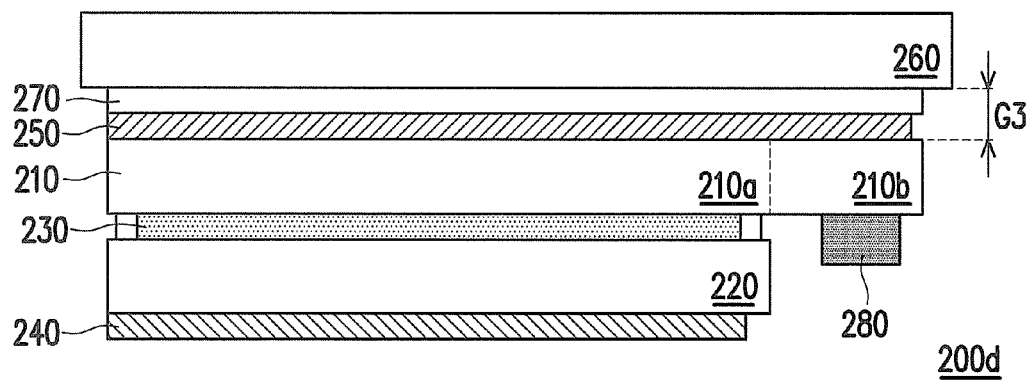
FIG. 4 is a schematic cross-sectional view illustrating an LCD panel according to a third embodiment of the invention.

FIG. 4 is a schematic cross-sectional view illustrating an LCD panel according to a third embodiment of the invention. With reference to FIG. 2 and FIG. 4, the LCD panel 200d of this embodiment is similar to the LCD panel 200a of the first embodiment, while the LCD panel 200d of this embodiment further includes an optical adhesive layer 270. The optical adhesive layer 270 and the analyzer 250 are located at the same side of the active device array substrate 210, and the cover 260 is joined to the analyzer 250 through the optical adhesive layer 270. Specifically, the optical adhesive layer 270 and the analyzer 250 are stacked between the active device array substrate 210 and the cover 260, and the analyzer 250 is located between the optical adhesive layer 270 and the active device array substrate 210. The optical adhesive layer 270 and the analyzer 250 both correspond to the active region 210a and a region 210b of the active device array substrate 210. Additionally, the analyzer 250 of this embodiment can have stickiness on one side. In other words, the analyzer 250 is merely required to be capable of adhering the active device array substrate 210. Undoubtedly, the analyzer 250 of this embodiment can also have stickiness on both sides, such that the adhesion between the analyzer 250 and the optical adhesive layer 270 and the adhesion between the analyzer 250 and the active device array substrate 210 can be rather strong.

Note that the distance G3 between the cover 260 and the active device array substrate 210 is substantially equal to the total thickness of the analyzer 250 and the optical adhesive layer 270. Apparently, even though the distance G3 is greater than the distance G2 of the first embodiment (as shown in FIG. 2), the distance G3 is less than the gap G1 described in the related art.

Fourth Embodiment

Figure 5A:
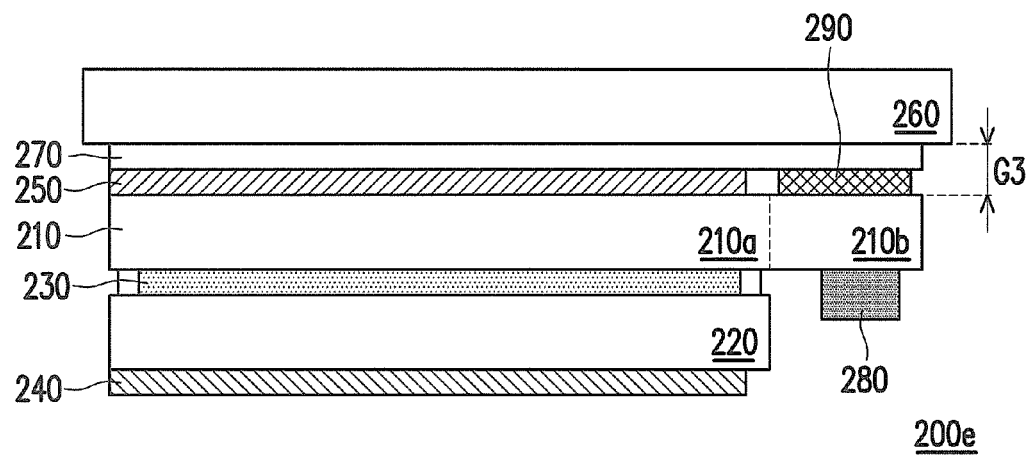
FIG. 5A and FIG. 5B are schematic cross-sectional views illustrating an LCD panel according to a fourth embodiment of the invention.
Figure 5B:
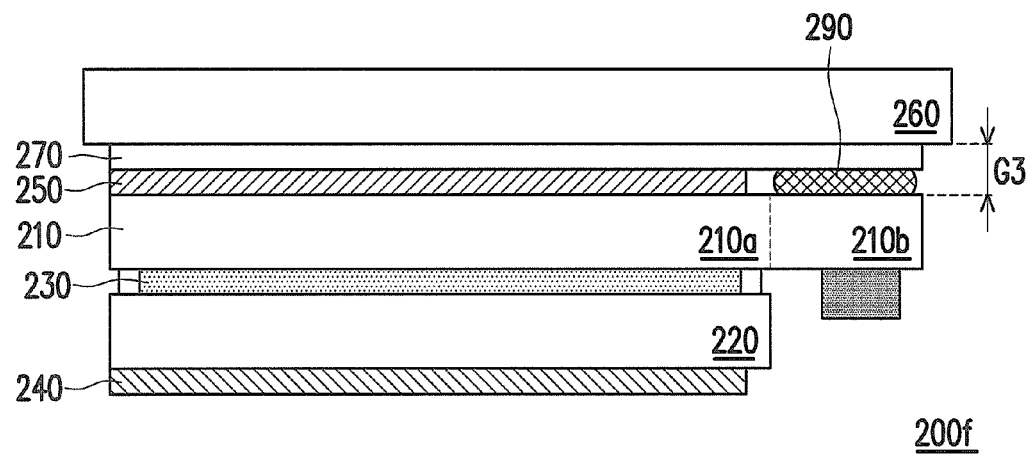

FIG. 5A and FIG. 5B are schematic cross-sectional views illustrating an LCD panel according to a fourth embodiment of the invention. With reference to FIG. 4, FIG. 5A, and FIG. 5B, the LCD panels 200e and 200f of this embodiment are similar to the LCD panel 200d of the third embodiment, while each of the LCD panels 200e and 200f of this embodiment further includes an adhesive material 290. The adhesive material 290, the optical adhesive layer 270, and the analyzer 250 are located at the same side of the active device array substrate 210. The optical adhesive layer 270 covers the analyzer 250 and the adhesive material 290, and the cover 260 is joined to the adhesive material 290 and the analyzer 250 through the optical adhesive layer 270. That is to say, the cover 260 is joined to the region 210b of the active device array substrate 210 through the adhesive material 290, and the cover 260 is joined to the active region 210a of the active device array substrate 210 through the analyzer 250. Specifically, the analyzer 250 corresponds to the active region 210a, and the adhesive material 290 corresponds to the region 210b.

As indicated in FIG. 5A and FIG. 5B, the optical adhesive layer 270 and the analyzer 250 are stacked between the active region 210a of the active device array substrate 210 and the cover 260, and the optical adhesive layer 270 and the adhesive material 290 are stacked between the region 210b of the active device array substrate 210 and the cover 260. The adhesive material 290 can be in contact with or not in contact with the analyzer 250, and the thickness of the adhesive material 290 can be substantially the same as the thickness of the analyzer 250. Besides, in this embodiment, the adhesive material 290 is, for instance, a single-sided tape, a double-sided tape (as shown in FIG. 5A), or a glue (as shown in FIG. 5B). For instance, the thickness of the adhesive material 290 is substantially equal to the thickness of the analyzer 250.

Based on the above, the adhesive material 290 of this embodiment can be easily chosen, i.e., the material that has the similar physical property to that of the analyzer 250 and that of the optical adhesive layer 270 is applicable. When the physical property of the adhesive material 290 is similar to that of the analyzer 250 and that of the optical adhesive layer 270, the adhesion between the cover 260 and the active device array substrate 210 is rather strong.

Fifth Embodiment

Figure 6A:
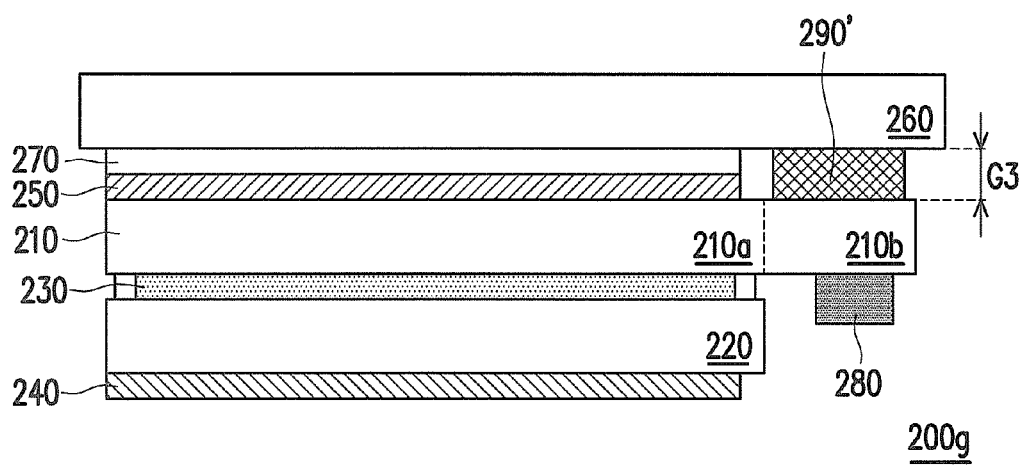
FIG. 6A and FIG. 6B are schematic cross-sectional views illustrating an LCD panel according to a fifth embodiment of the invention.
Figure 6B:
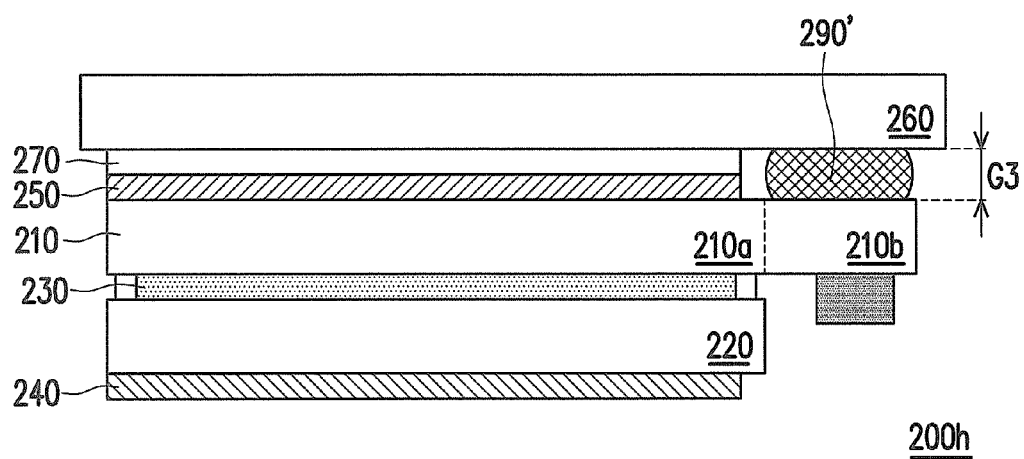

FIG. 6A and FIG. 6B are schematic cross-sectional views illustrating an LCD panel according to a fifth embodiment of the invention. With reference to FIG. 5A, FIG. 5B, FIG. 6A, and FIG. 6B, the LCD panels 200g and 200h of this embodiment are similar to the LCD panels 200e and 200f of the fourth embodiment, while the optical adhesive layer 270 in each of the LCD panels 200g and 200h of this embodiment merely covers the analyzer 250. The cover 260 is joined to the analyzer 250 through the optical adhesive layer 270, and the cover 260 is directly joined to the adhesive material 290'. In particular, the optical adhesive layer 270 corresponds to the active region 210a, the adhesive material 290' corresponds to the region 210b, and the thickness of the adhesive material 290' is substantially equal to the total thickness of the analyzer 250 and the optical adhesive layer 270.

According to this embodiment, the adhesive material 290' is a double-sided tape, a single-sided tape (as shown in FIG. 6A), or a glue (as shown in FIG. 6B), for instance.

Based on the above, the adhesive material 290' of this embodiment can be easily chosen, i.e., the material that has the similar physical property to that of the analyzer 250 and that of the optical adhesive layer 270 is applicable. When the physical property of the adhesive material 290' is similar to that of the analyzer 250 and that of the optical adhesive layer 270, the adhesion between the cover 260 and the active device array substrate 210 is rather strong.

Since the cover and the active device array substrate are joined in various manner according to the invention, the reliability of the LCD panel can be effectively improved in this invention.

Although the invention has been disclosed by the above embodiments, they are not intended to limit the invention. Those skilled in the art may make some modifications and alterations without departing from the spirit and scope of the invention. Therefore, the protection range of the invention falls in the appended claims.

What is claimed is:
1. A liquid crystal display panel comprising:
an active device array substrate;
an opposite substrate;
a liquid crystal layer configured between the active device array substrate and the opposite substrate;
a polarizer configured on the opposite substrate, the polarizer and the liquid crystal layer being located at two opposite sides of the opposite substrate, respectively;
an analyzer configured on the active device array substrate, the analyzer and the liquid crystal layer being located at two opposite sides of the active device array substrate, respectively;
a cover joined to the analyzer;
an optical adhesive layer, the optical adhesive layer and the analyzer being located at the same side of the active device array substrate, the cover being joined to the analyzer through the optical adhesive layer; and
an adhesive material configured on the active device array substrate, the analyzer and the adhesive material being located at the same side of the active device array substrate, the optical adhesive layer and the adhesive material being located at the same side of the active device array substrate.

2. The liquid crystal display panel as claimed in claim 1, wherein the optical adhesive layer and the adhesive material are joined to the analyzer and the active device array substrate, respectively.

3. The liquid crystal display panel as claimed in claim 2, wherein the active device array substrate has an active region corresponding to the analyzer, the adhesive material is located outside the active region, the optical adhesive layer covers the analyzer and the adhesive material, and the cover is joined to the analyzer and the adhesive material through the optical adhesive layer.

4. The liquid crystal display panel as claimed in claim 3, wherein a thickness of the adhesive material is substantially equal to a thickness of the analyzer.

5. The liquid crystal display panel as claimed in claim 3, wherein the adhesive material comprises a tape or a glue.

6. The liquid crystal display panel as claimed in claim 2, wherein the active device array substrate has an active region corresponding to the analyzer, the adhesive material is located outside the active region, the optical adhesive layer covers the analyzer, the cover is joined to the analyzer through the optical adhesive layer, and the cover is directly joined to the adhesive material.

7. The liquid crystal display panel as claimed in claim 6, wherein a thickness of the adhesive material is substantially equal to a total thickness of the analyzer and the optical adhesive layer.

8. The liquid crystal display panel as claimed in claim 6, wherein the adhesive material comprises a tape or a glue.

9. The liquid crystal display panel as claimed in claim 1, wherein the active device array substrate has an active region, and the analyzer and the optical adhesive layer correspond to the active region and a region of the active device array substrate other than the active region.

10. The liquid crystal display panel as claimed in claim 1, further comprising a driving chip electrically connected to the active device array substrate, the driving chip and the cover being respectively located at the two opposite sides of the active device array substrate.

11. The liquid crystal display panel as claimed in claim 1, wherein the active device array substrate has an active region, the analyzer corresponds to the active region and a region of the active device array substrate other than the active region, and the cover is adhered to the active device array substrate through the analyzer.

12. The liquid crystal display panel as claimed in claim 1, wherein an area of the active device array substrate is greater than an area of the opposite substrate.

13. A liquid crystal display panel comprising:
an active device array substrate;
an opposite substrate;
a liquid crystal layer configured between the active device array substrate and the opposite substrate;
a polarizer configured on the opposite substrate, the polarizer and the liquid crystal layer being located at two opposite sides of the opposite substrate, respectively;
an analyzer configured on the active device array substrate, the analyzer and the liquid crystal layer being located at two opposite sides of the active device array substrate, respectively;
a cover joined to the analyzer; and
an adhesive material configured on the active device array substrate, the analyzer and the adhesive material being located at the same side of the active device array substrate.

14. The liquid crystal display panel as claimed in claim 13, wherein the analyzer and the adhesive material are located between the cover and the active device array substrate.

15. The liquid crystal display panel as claimed in claim 13, wherein the active device array substrate has an active region corresponding to the analyzer, the adhesive material is located outside the active region, and the cover is joined to the analyzer and the adhesive material.

16. The liquid crystal display panel as claimed in claim 15, wherein a thickness of the adhesive material is substantially equal to a thickness of the analyzer.

17. The liquid crystal display panel as claimed in claim 15, wherein the adhesive material comprises a tape or a glue.

* * * * *